Patented Feb. 17, 1948

2,436,360

UNITED STATES PATENT OFFICE 2,436,360

PREPARATION OF 2-AMINO-5-CHLORO-PYRIMIDINE

Martin Everett Hultquist, North Plainfield, N. J., assignor to American Cyanamid Company, New York, N. Y., a corporation of Maine No Drawing. Application November 21, 1941, Serial No. 419,868

3 Claims. (Cl. 260—251)

This invention relates to 2-amino-5-halogen pyrimidine and a method for preparing the same.

2-amino-4-chloropyrimidine as an intermediate for the production of sulfanilamide pyrimidine is of outstanding commercial importance. In the past, it has been prepared from a guanidine salt by a number of different reactions. These include the condensation of guanidine salts with formylacetic acid in acid solution or sodium salts of formylacetic acid in basic solutions to form isocytosine. The isocytosine, or its sulfate, is then chlorinated with phosphorus oxychloride to form the 2-amino-4-chloropyrimidine.

This process is successful but the chlorinating step is extremely difficult to manipulate, particularly on a commercial scale. It involves the use of phosphorus oxychloride which is not only relatively expensive but exceedingly hard to handle. Escaping fumes cause disagreeable physiological results. It requires that the temperature be kept very low either by a powerful refrigerating system or the use of solid carbon dioxide.

It will be noted that for use in reactions which remove the chlorine atom as in the production of 2-aminopyrimidine the location of the chlorine atom on the pyrimidine ring is not important provided the reaction is capable of removing the chlorine atom from the various isomers. The present invention is based on my discovery that when a guanidine salt is condensed with halogenmalondialdehyde the 2-aminohalogen pyrimidine is formed directly with the hologen atom in the 5 rather that the 4 position. These 2-amino-5-halogenpyrimidines are new compounds. This procedure eliminates the difficult chlorinating step necessary in making 2-amino-4-chloropyrimidine. It is therefore important, not only in that it shortens the old process by one step, but because the eliminated step involved the necessity for going through the difficult chlorinating manipulation.

Halogenmalondialdehyde may be prepared from the corresponding tetrahalopropene by reacting the latter with strong sulfuric acid. As pointed out, the particular halogen is unimportant. Chlorine is the most advantageous because of its commercial availability and relatively low cost. However, other halogens, particularly bromine, are not impractical. It is not necessary to isolate the halogenmalondialdehyde unless it is desired to do so. Practically it is advantageous to use it in the solution in which it is formed and purify the ultimate product.

My reaction operates effectively with substantially any guanidine salt. For practical purposes it is preferred to use the cheaper salts. Since the anion does not appear to enter into the reaction except in the case of an acid radical, capable of reacting with the compounds produced or with the reagents, any of the common salts such as the carbonate, sulfate, hydrochloride or the like may be used.

The temperature at which the reaction is carried out is not critical. Good results may be obtained in a reasonable time at from about 90° to 100° C. After the reaction is completed, the product may be collected by drowning the reaction mixture in ice and water and neutralizing it to a pH of approximately 7.5 and filtering out the precipitated product. Ammonium hydroxide is suitable for the neutralization but other alkalis may be used. While the temperature at which the neutralization is carried out is not critical, it is well to keep the temperature below about 20° C.

The invention will be described in greater detail in conjunction with the following specific examples which are meant to illustrate and not to limit the scope of the invention. The parts are by weight.

Example 1

A solution of chloromalondialdehyde, obtained by reacting 90 parts of tetrachloropropene and 230 parts of 94% sulfuric acid, was mixed with 400 parts of fuming sulfuric acid and 50 parts of guanidine carbonate. The mixture was stirred and the temperature held below 50° C. during mixing. The mixture was then heated for 1½ hours at 90 to 95° C. during which period some hydrochloric acid was evolved. After cooling the mixture to 20° C. it was poured into ice water and enough ammonium hydroxide was added to start precipitation. Decolorizing carbon was added and the solution clarified. Sufficient ammonium hydroxide to neutralize was then added and the mixture cooled to 10° C. The precipitate was filtered, washed and dried. The yield was 48 parts or 75% of the theoretical.

This product was dissolved in water and hydrochloric acid, decolorizing carbon added, the solution clarified and the product again precipitated with ammonium hydroxide. The product was recrystallized from "Cellusolve" using decolorizing carbon. The product consisted of colorless, thin, six-sided plates, melting at 234° to 236° C. in a sealed tube. The material sublimed so rapidly that an open tube could not be used.

Example 2

10 parts of chloromalondialdehyde and 9 parts of guanidine carbonate were added to 50 parts of fuming sulfuric acid while keeping the temperature below 50° C. The mixture was then heated to 90 to 100° C. for 15 minutes, cooled to 20° C., poured into ice water and neutralized to pH 7 to 8 with concentrated ammonium hydroxide. This gave a yield of 3½ parts crude tan crystalline 2-amino-5-chloropyrimidine after filtering, washing, and drying.

I claim:

1. A method of producing 2-amino-5-halogenpyrimidine which comprises reacting a tetrahalogenpropene with concentrated sulfuric acid, adding thereto a large excess of fuming sulfuric acid and an equivalent amount of a guanidine salt, maintaining the temperature below about 50° C. until admixture is complete, heating the mixture at about 90–95° C. until the reaction is complete, cooling the mixture to room temperature, drowning the cooled mixture in ice water, neutralizing the drowned mixture with ammonium hydroxide and isolating the resultant precipitate.

2. A method according to claim 1 in which the halogen is chlorine.

3. A method of producing 2-amino-5-halogenpyrimidine which comprises reacting a halogenmalondialdehyde in a large excess of fuming sulfuric acid and an equivalent amount of a guanidine salt, maintaining the temperature below about 50° C. until admixture is complete, heating the mixture at about 90–95° C. until the reaction is complete, cooling the mixture to room temperature, drowning the cooled mixture in ice water, neutralizing the drowned mixture with ammonium hydroxide and isolating the resultant precipitate.

MARTIN EVERETT HULTQUIST.

REFERENCES CITED

The following references are of record in the file of this patent:

UNITED STATES PATENTS

| Number | Name | Date |
|---|---|---|
| 2,224,811 | English | Dec. 10, 1940 |
| 2,224,836 | Roblin | Dec. 10, 1940 |
| 2,309,739 | Roblin | Feb. 2, 1940 |

OTHER REFERENCES

Berichte de deut. Chem., vol. 36, page 3669.
J. Amer. Chem. Soc. vol. 34, page 91.
Beilstein (addition vol.) 1, page 396.
Chemical Review, vol 13, Oct. 1933, No. 2, page 200.